United States Patent
Freund et al.

(10) Patent No.: US 6,289,343 B1
(45) Date of Patent: Sep. 11, 2001

(54) APPARATUS AND METHOD FOR PERFORMING SEMANTIC CONCURRENCY CONTROL IN DISPATCHING CLIENT REQUESTS WITHIN A SERVER IN A CLIENT/SERVER COMPUTER SYSTEM

(75) Inventors: Thomas Freund, Winchester; Iain Stuart Caldwell Houston, Sherborne, both of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/154,804

(22) Filed: Sep. 17, 1998

(30) Foreign Application Priority Data

Feb. 4, 1998 (GB) .................................. 9802298

(51) Int. Cl.⁷ .............................. G06F 17/30; G06F 15/16
(52) U.S. Cl. ................................ 707/8; 707/10; 707/103; 709/201; 709/203; 709/217
(58) Field of Search ................................ 707/8, 103, 10; 709/201, 203, 217

(56) References Cited

U.S. PATENT DOCUMENTS

| 5,734,909 | * | 3/1998 | Bennett | 395/726 |
| 5,758,184 | * | 5/1998 | Lucovsky et al. | 710/6 |
| 5,778,378 | * | 7/1998 | Rubin | 797/103 |

(List continued on next page.)

FOREIGN PATENT DOCUMENTS

| 818 730 | 1/1998 | (EP) . |
| 855649 | 7/1998 | (EP) . |
| 2 320 594 | 6/1998 | (GB) . |

(List continued on next page.)

OTHER PUBLICATIONS

Grasso, A Programmable Concurrency Control Service for COBRA, Services in Distributed and Networked Environments, pp. 108–113, Jun. 1996.*

Rakow et al, Semantic Concurrency Control in Object Oriented, Apr., 1993, IEEE, Proceedings. Ninth International Conference on pp. 233–242.*

Patent Abstracts of Japan—No. 06059917 "Exclusive Control System for Shared Resources", Applicant Hitachi Ltd.

Patent Abstracts of Japan—No. 5–158777 "Data Management System", Applicant Hitachi Ltd.

Patent Abstracts of Japan—No. 2–291028 "Exclusive Control System for Computer Resources", Applicant Fujitsu Ltd.

"Comment on Distributed Object, CORBA", By Hiroyuki Sato (Corporate Software Planning & Development Center, Cannon Inc. And Kunio Ohono (NTT Human Interface Lab)Publication Date: Sep. 1994.

Primary Examiner—Thomas Black
Assistant Examiner—Frantz Coby
(74) Attorney, Agent, or Firm—A. Bruce Clay

(57) ABSTRACT

An apparatus for dispatching client requests for execution by a server object in a heterogeneous object-oriented client/server computing environment, the apparatus has: a request-holding buffer having an input connected to a communications channel which channels the client requests to the apparatus, and an output; a plurality of parallel execution threads connected to the output of the buffer; and a semantic concurrency control means for examining the semantics of a request in the buffer and the semantics of each request presently being executed on any of the plurality of parallel execution threads, and for delaying the request from being dispatched from the buffer to an execution thread if the examined semantics of the requests indicate that such dispatch would cause conflicting access to the server object's resources.

10 Claims, 3 Drawing Sheets

U.S. PATENT DOCUMENTS

| | | | |
|---|---|---|---|
| 5,832,519 | * 11/1998 | Bowen et al. | 707/203 |
| 5,925,098 | * 7/1999 | Freund et al. | 709/203 |
| 5,999,942 | * 12/1999 | Talati | 707/104 |
| 6,029,206 | * 2/2000 | Endicott et al. | 707/103 |
| 6,041,383 | * 3/2000 | Jeffords et al. | 710/200 |
| 6,052,731 | * 4/2000 | Holdsworth et al. | 709/229 |
| 6,070,197 | * 5/2000 | Cobb et al. | 707/10 |

FOREIGN PATENT DOCUMENTS

| | | | |
|---|---|---|---|
| 2 321 540 | 7/1998 | (GB) | . |
| 2-291028 | 11/1990 | (JP) | . |
| 421134A | 1/1992 | (JP) | G06F/9/46 |
| 5-158777 | 6/1993 | (JP) | . |
| 6-59917 | 3/1994 | (JP) | . |
| 9511858 | 11/1997 | (JP) | G06F/9/46 |
| 9707621 | 8/1995 | (WO) | . |

* cited by examiner

APPARATUS AND METHOD FOR PERFORMING SEMANTIC CONCURRENCY CONTROL IN DISPATCHING CLIENT REQUESTS WITHIN A SERVER IN A CLIENT/SERVER COMPUTER SYSTEM

FIELD OF THE INVENTION

The invention relates to the field of client/server (also known as "distributed") computing, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A 2. These latter two publications are hereby incorporated by reference. However, an example, of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms as is shown in FIG. 1. The OMG has set forth published standards by which client computers (e.g. 10) communicate (in OOP form) with server machines (e.g. 20). As part of these standards, an Object Request Broker has been defined, which provides the object-oriented bridge between the client and the server machines. The ORB decouples the client and server applications from the object oriented implementation details, performing at least part of the work of the first and second logic means 50 and 90 as well as the connection means 80.

FIG. 2 shows a conventional architecture for such a system. Once client requests find their way through the ORB 21 and into the server, the ORB finds a particular server object capable of executing the request and sends the request to that server object's object adapter 22 (also defined by OMG standard) where it is stored in the object adapter's buffer to await processing by the server object. The server object has a plurality of parallel execution threads (23a, 23b, 23c) upon any of which it can run an instance of itself. In this way, the server object is able to process plural requests at the same time. The object adapter 22 looks to see which of the parallel execution threads is ready to process another request and then assigns one of the requests to the next available execution thread. This is explained in the above-mentioned U.S. Pat. as a "dispatching" mechanism whereby the server dispatches requests to execution threads.

The OMG-standard server architecture of FIG. 2 finds particular utility in the field of transaction processing. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10 in FIG. 1) communicating with one particular server computer (e.g., 20) over a series of client requests which are processed by the server.

In typical client/server systems, client and server systems are each contributing to the overall processing of such transactions. Further, many different clients may be concurrently attempting to use the same server to engage in separate transactions. For example, many different banking ATM machines (client systems) may be trying to concurrently begin transactions so as to access data from a popular database program running on the bank's large central server. In some of these situations, the server must be able to isolate these concurrent transactions so that they do not affect each other. That is, until one transaction is finished (either all parts are committed or all parts are aborted) other transactions trying to access the same server objects must be made to wait.

For example, if a husband is trying to transfer $2000 from a family's checking account into the family's higher interest paying savings account at an ATM machine at one bank on one side of town and his wife is attempting to perform the same transaction at another ATM (owned by a different bank) on the other side of town, the server must be able to deal with this situation effectively so that the two concurrent transactions do not create a problem for the bank owning the database server.

The way this problem is typically solved is for the server database program to perform transactional locking on concurrent accesses. That is, the database management system (DBMS) of the server would lock access to the family's account data stored in the database once a first client (e.g. the husband's ATM) requests access. Then, the husband's transaction would continue in isolation despite the fact that the wife's transaction has been requested concurrently. The wife's client ATM would not be granted access to the data because the husband's client ATM would already have a lock on the data.

Placing the concurrency control responsibility in the server application (i.e. in the DBMS) has worked fine for database servers as discussed above which already have the complex locking techniques integrated into their management system software. However, if other types of applications are to be used, the above system requires that the server application programmer include the complex locking schemes into his/her program while writing the object-oriented program. Also, the programmer must have an in-depth knowledge of transaction theory in order to be able to create the appropriate transaction context into the concurrency control aspects of the program.

To overcome this problem, the International Business Machines Corporation (IBM) has filed a patent application (UK Patent Application No. 9701566.3) on Jan. 25 1997, which discloses a method whereby transactional locking is performed within the ORB (21 of FIG. 2). That is, as each client request comes through the ORB 21 on the way to the object adapter 22, the method determines whether a lock on server resources is necessary and obtains such a lock if the locks will not conflict with currently held locks. If a conflict exists, the incoming request must wait until the currently held conflicting lock (from a previous request) is released.

In both of these prior approaches, however, it is necessary to obtain locks on server resources in order to carry out concurrency control. The processing steps involved in obtaining such locks are as follows. First, an incoming request is dispatched to an available thread and thus an instance of the server object is instantiated. Second, local storage for this particular instance of the server object is obtained for this thread. Third, the program and data associated with the server object is loaded into the storage. Fourth, the relevant file is accessed for execution. Finally, after all of the above four steps are carried out, a lock is obtained on the server object to ensure that subsequent requests will not be allowed to conflict with this request's access to the server object's resources. For the next dispatched request, the first four steps are carried out and if this request requires access to a locked resource, the request must wait until the lock on the server object from the first request has been released.

The use of locks to perform concurrency control often results in an inefficient use of central processor unit (cpu) resources, especially as the number of concurrent requests increases. For example, assume that 2000 users are all sharing the same exchange rate object and that 1999 of them are clients that would like to obtain the most recent value of a popular exchange rate (e.g., from United States dollars to United Kingdom pounds sterling) and one user is requesting to update the value of the exchange rate. The use of locks results in 2000 threads being used and 2000 local storage areas being allocated. A very large number of cpu processing cycles is required in dispatching this many requests onto threads, obtaining this many storage areas, loading the large number of programs and accessing the large number of files. Thus, a great need exists in this art for a more efficient way to dispatch client requests.

SUMMARY OF THE INVENTION

According to one aspect, the present invention provides an apparatus for dispatching client requests for execution by a server object in a heterogeneous object-oriented client/server computing environment, the apparatus has: a request-holding buffer having an input connected to a communications channel which channels the client requests to the apparatus, and an output; a plurality of parallel execution threads connected to the output of the buffer; and a semantic concurrency control means for examining the semantics of a request in the buffer and the semantics of each request presently being executed on any of the plurality of parallel execution threads, and for delaying the request from being dispatched from the buffer to an execution thread if the examined semantics of the requests indicate that such dispatch would cause conflicting access to the server object's resources.

Preferably, the buffer is included within an object adapter. Further preferably, the communications channel includes an object request broker. Further preferably, the semantic concurrency control means also takes into account the state of the server object in making a determination as to whether the dispatch of a request in the buffer would conflict with a request that has already been dispatched to a thread.

According to a second aspect, the present invention provides a method of dispatching client requests for execution by a server object in a heterogeneous object-oriented client/server computing environment, having the steps of: examining the semantics of a request in a request-holding buffer having an input connected to a communications channel which channels the client requests to the apparatus, and an output; examining the semantics of each request presently being executed on any of a plurality of parallel execution threads connected to the output of the buffer; and delaying the request from being dispatched from the buffer to an execution thread if the examined semantics of the requests indicate that such dispatch would cause conflicting access to the server object's resources.

According to a third aspect, the present invention provides a computer program product for, when run on a computer, carrying out the method of the second aspect of the invention.

Thus, with the present invention, as there is no need to obtain locks on the server object resources, concurrency control of a server object with respect to client requests received at the server can be carried out in a highly efficient manner, with a very large savings in cpu processing cycles. Specifically, when locks are obtained, all requests in the buffer are dispatched to threads, storage is allocated for each dispatched request and other associated processing takes place for each dispatched request. However, with the present invention, a request is not dispatched from the buffer (and no storage is allocated for the request) until it is determined that the request will not involve a conflicting access to the server object resource with respect to other requests that are presently executing on a thread.

BRIEF DESCRIPTION OF THE DRAWINGS

The above-described invention will be better understood by reference to the detailed description of a preferred embodiment presented below, in conjunction with the following drawing figures.

DETAILED DESCRIPTION OF THE PREFERRED EMBODIMENT

Figure 1:
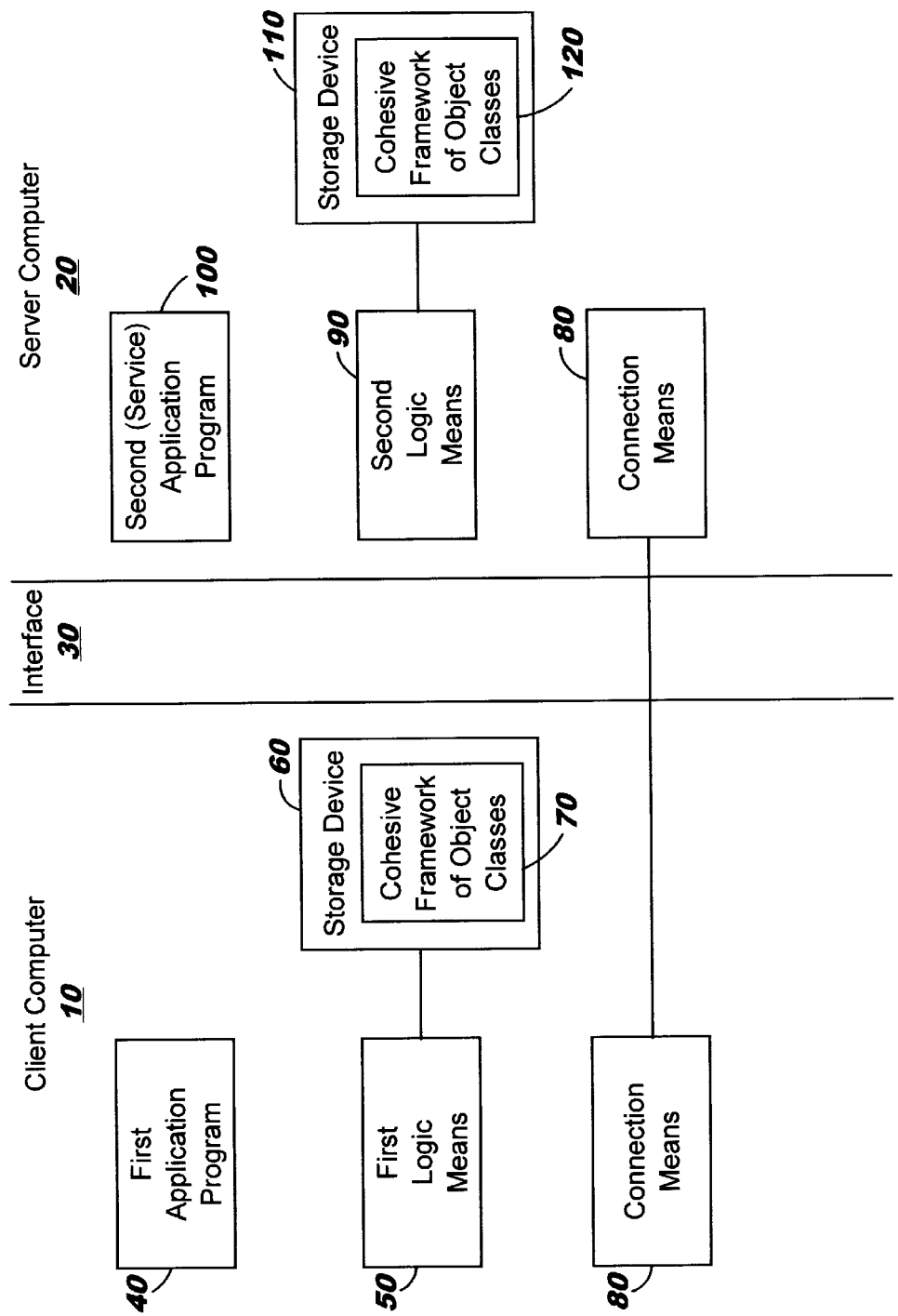
FIG. 1 is a block diagram of a well-known heterogeneous client/server architecture using object technology, in the context of which the present invention can be applied.
Figure 2:
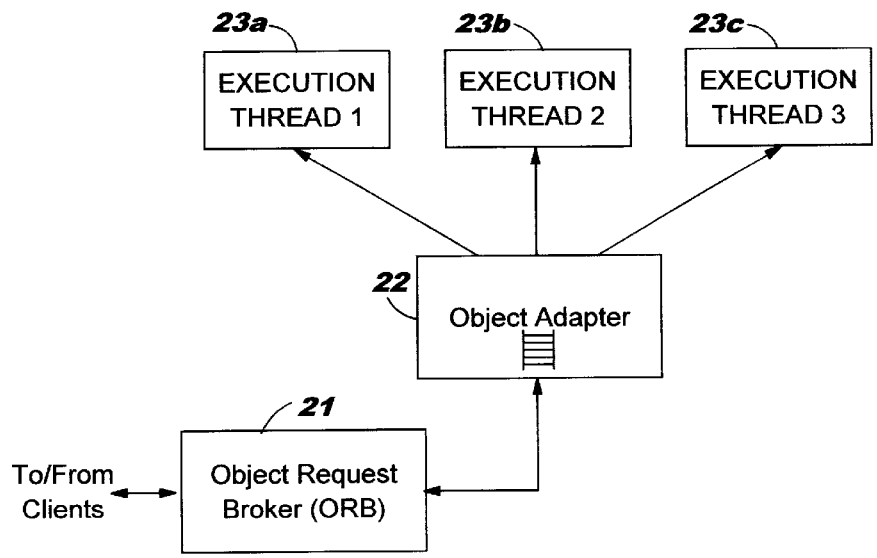
FIG. 2 is a block diagram of a server architecture according to a conventional design.
Figure 3:
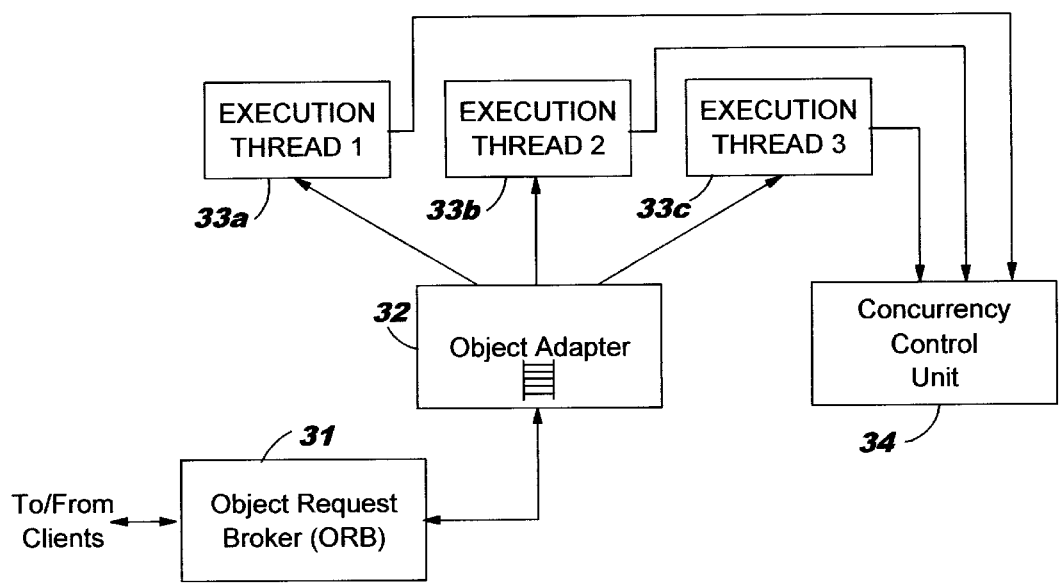
FIG. 3 is a block diagram of a server architecture according to a preferred embodiment of the present invention.

In the preferred embodiment of FIG. 3, requests received at the server process from client processes are first received by the server's ORB 31. ORB 31 then passes on requests destined to a particular server object to that server object's object adapter 32. This server object has a number of parallel execution threads 33a, 33b and 33c where different instances of the server object can be running in parallel, in order to execute a large number of client requests. This is all analogous to the prior art of FIG. 2 that was described above.

An extra software unit is added to the prior art of FIG. 2, according to the present invention's preferred embodiment of FIG. 3. This extra unit is a concurrency control unit 34 which receives an input from the object adapter 32 and from each of the execution threads 33a to 33c and provides an output to the object adapter 32. The concurrency control unit 34 performs the function of making sure that a client request in the object adapter 32 is not dispatched to an execution thread if doing so would result in conflicting access to the server object's resources.

In the example that will be described hereinbelow to illustrate the operation of this preferred embodiment, the server object will represent a bank account. Thus, the various requests that will be discussed are requests to access a particular bank account. One request is from a client ATM (automated teller machine) to withdraw funds from this account. This request is from the person owning the account who wishes to withdraw some funds. A second request is from an official of the bank who is requesting to find out the amount of overdraft that is associated with the bank account (perhaps the account balance is getting close to zero and the bank official is concerned that the account will go into the red). A third request is from another client ATM to check the balance of the account. This request is from the account owner's wife, who is on the other side of town from the owner at another client ATM machine.

The concurrency control unit 34 takes an input from the request at the top of the buffer in object adapter 32 (the request that is next in line to be dispatched to an execution thread 33a, 33b or 33c) in order to determine the semantics of this request. That is, the concurrency control unit 34 determines whether this request is requesting read access to the bank account object, write access to the bank account object, or neither read nor write access to the bank account object.

The concurrency control unit 34 also takes inputs from each of the execution threads 33a, 33b and 33c in order to determine the semantics of the requests that are currently being executed on the threads. That is, the concurrency control unit 34 determines whether each request being executed on a thread involves read access to the bank account object, write access to the bank account object, or neither read nor write access to the bank account object.

The concurrency control unit 34 then compares the semantics of the request at the top of the object adapter (32) buffer to the semantics of each of the requests being presently executed on each of the execution threads (33a, 33b, 33c). The concurrency control unit 34 only allows the top request to be dispatched from the buffer to an available thread if the dispatching of this request would not result in a conflicting access to the server object resource.

For example, if the top request in the buffer is the wife's request to check the balance of the bank account, the concurrency control unit 34 checks the semantics of this request and determines that this is a read request. The request is seeking only to read the balance of the bank account (not to change the value of anything in the database associated with the account). Now, if the only request executing on any of the execution threads (say, thread 33a) is the request of the bank official to check the prearranged overdraft on the account, the concurrency control unit 34 checks the semantics of this request and again determines that it is a read request (no stored values need be altered to simply obtain the overdraft value and return it to the official). Since these two requests are both read requests, the concurrency control unit 34 dispatches the top request in the object adapter 32 to one of the other threads (say, thread 33b).

If, however, the account owner's request to withdraw money is presently being executed on thread 33a, and the top request in object adapter 32 is the account owner's wife's request to check the balance of this account, a different result is achieved. Because the semantics of the presently executing request on thread 33a indicate that this is a write request (as it will result in lowering the balance of the bank account), the top request in the object adapter buffer (which is seeking to read the same value) is not dispatched to a thread but is instead made to wait until the request executing on thread 33a is finished.

Figure 4:
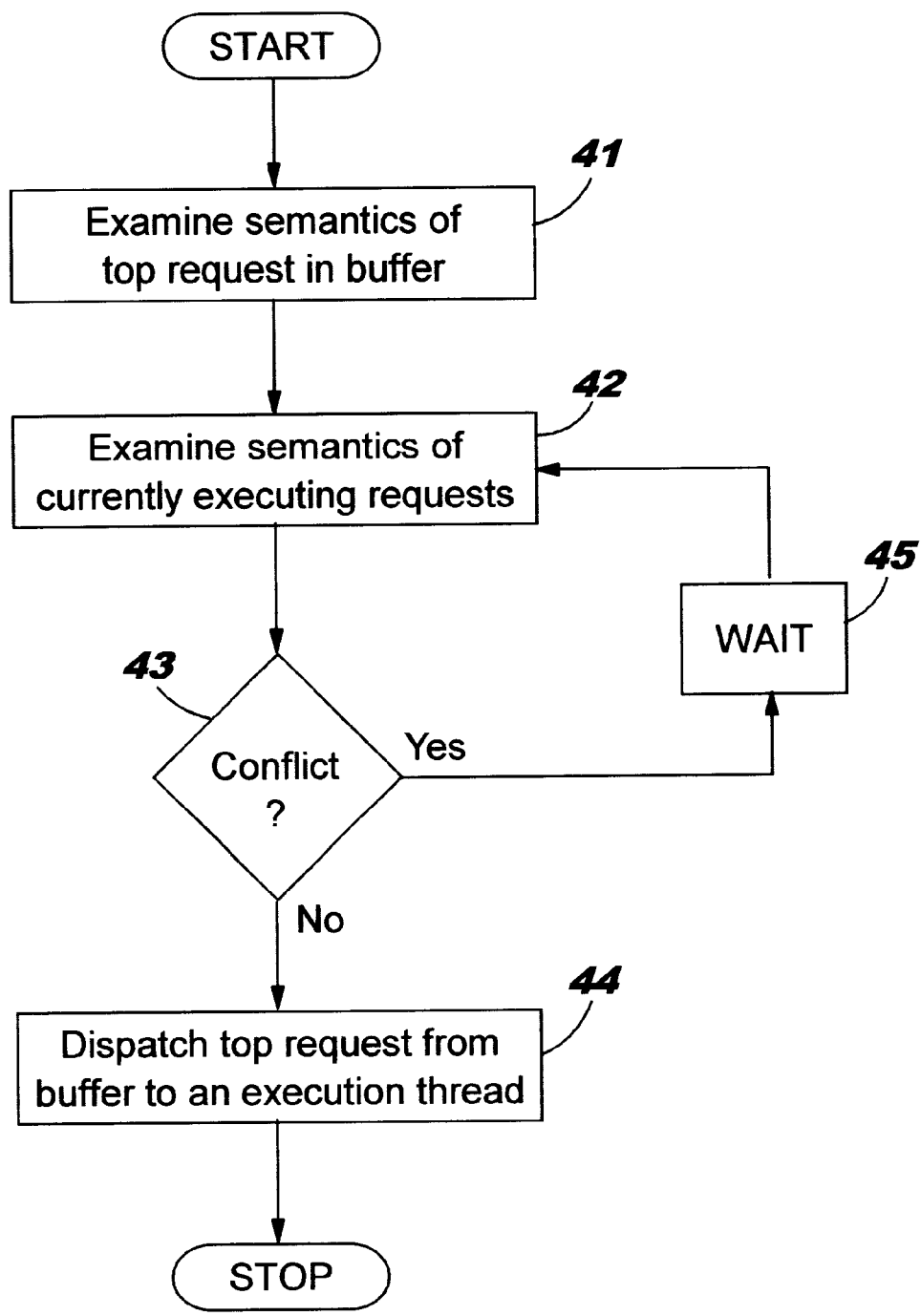
FIG. 4 is a flow chart showing the processing steps involved according to a preferred embodiment of the present invention.

The steps carried out by the preferred embodiment of the present invention are illustrated in the flowchart of FIG. 4.

At step 41, the concurrency control unit 34 examines the semantics of the top request sitting in the buffer of the object adapter 32 (this is the request which is next to be dispatched from the buffer). That is, the unit 34 determines whether this request is requesting read or write access to the server object resource.

At step 42, the unit 34 examines the semantics of the requests presently executing on each of the execution threads 33a, 33b and 33c. That is, the unit 34 determines whether each of these requests is performing read or write access to the server object resource.

At step 43, the unit 34 uses the information that it has gathered from steps 41 and 42 in order to determine whether the top request can be dispatched (step 44) to one of the available execution threads, or whether it should be made to wait (step 45) until the execution of at least one of the presently executing requests has finished accessing the server object resource. The way this is done is that if a read request is awaiting dispatch at the top of the buffer and all of the presently executing requests are also read requests, then the read request can be dispatched to an available thread for concurrent execution, as there is no conflict between concurrent read operations on the same server object resource. However, there is a conflict when a write operation is concurrently executing along with another write operation or with a read operation. Thus, the unit 34 would delay the dispatch of the top request in the object adapter 32 if this latter situation would exist upon dispatch.

Depending on the nature of the server object, the concurrency control unit 34 can also consider the present state of the server object in making a decision as to whether to allow a request to be dispatched. For example, assume that the server object is a queue with each element of the queue being separately addressable for read/write purposes. One request from a first transaction is requesting to read the element at the front of the queue and this request has already been dispatched to an execution thread. Now, a second request (that is awaiting dispatch) that is requesting to write to the last element of the queue can be concurrently dispatched to the same server object, even though this second request is requesting write access to the same server object that the first request has already been granted read access to (provided that the queue is non-empty). This is because the second request, albeit a write request, is not conflicting with the first request (which is a read request). Since the server object is made up of plural elements, each of these elements can be accessed separately by different requests without conflicting with each other.

Also, the concurrency control unit 34 does not need to always consider only the top request in the buffer as the next candidate for dispatch. The unit 34 can examine all of the requests in the buffer and take them out of order for dispatch.

We claim:

1. An apparatus for dispatching client requests for execution by a server object in a heterogeneous object-oriented client/server computing environment, the apparatus comprising:

a request-holding buffer having an input connected to a communications channel which channels the client requests to the apparatus, and an input;

a plurality of parallel execution threads connected to the output of the buffer; and a semantic concurrency control means for examining the semantics of a request in the buffer and the semantics of each request presently being executed on any of the plurality of parallel execution threads, and for delaying the request from being dispatched from the buffer to an execution thread if the examined semantics of the requests indicate that such dispatch would cause conflicting access to the server object's resources, thereby allowing for concurrency control to take place without the use of locks.

2. The apparatus of claim 1 wherein said buffer is included within an object adapter.

3. The apparatus of claim 1 wherein the communications channel includes an object request broker.

4. The apparatus of claim 1 wherein the semantic concurrency control means also takes into account the state of the server object in making a determination as to whether the dispatch of a request in the buffer would conflict with a request that has already been dispatched to a thread.

5. A method of dispatching client requests for execution by a server object in a heterogeneous object-oriented client/server computing environment, comprising the steps of:

examining the semantics of a request in a request-holding buffer having an input connected to a communications channel which channels the client requests to the apparatus, and an output;

examining the semantics of each request presently being executed on any of a plurality of parallel execution threads connected to the output of the buffer; and delaying the request from being dispatched from the buffer to an execution thread if the examined semantics of the requests indicate that such dispatch would cause conflicting access to the server object's resources, thereby allowing for concurrence control to take place without the use of locks.

6. The method of claim 5 wherein said buffer is included within an object adapter.

7. The method of claim 5 wherein the communications channel includes an object request broker.

8. A computer program product stored on a computer readable storage medium for, when run on a computer, carrying out a method of dispatching client requests for execution by a server object in a heterogeneous object-oriented client/server computing environment, the method comprising the steps of:

examining the semantics of a request in a request-holding buffer having an input connected to a communications channel which channels the client requests to the apparatus, and an output;

examining the semantics of each request presently being executed on any of a plurality of parallel execution threads connected to the output of the buffer; and delaying the request from being dispatched from the buffer to an execution thread if the examined semantics of the requests indicate that such dispatch would cause conflicting access to the server object's resources, thereby allowing for concurrency control to take place without the use of locks.

9. The product of claim 8 wherein said buffer is included within an object adapter.

10. The product of claim 8 wherein the communications channel includes an object request broker.

* * * * *

UNITED STATES PATENT AND TRADEMARK OFFICE
CERTIFICATE OF CORRECTION

PATENT NO. : 6,289,343 B1  Page 1 of 1
DATED : September 11, 2001
INVENTOR(S) : Thomas Freund and Iain Stuart Caldwell Houston It is certified that error appears in the above-identified patent and that said Letters Patent is hereby corrected as shown below:

<u>Column 8, claim 5,</u>
Line 37, delete "concurrence" and insert -- concurrency --.

Signed and Sealed this

Twenty-sixth Day of March, 2002

*Attest:*

JAMES E. ROGAN
*Attesting Officer*   *Director of the United States Patent and Trademark Office*